(12) United States Patent
Norbury, Jr. et al.

(10) Patent No.: US 9,574,788 B2
(45) Date of Patent: Feb. 21, 2017

(54) HEADLINER VENT HOUSING

(75) Inventors: Raymond L. Norbury, Jr., Duncanville, TX (US); John W. Baker, Red Oak, TX (US)

(73) Assignee: Cary Products Co., Inc., Hutchins, TX (US)

( * ) Notice: Subject to any disclaimer, the term of this patent is extended or adjusted under 35 U.S.C. 154(b) by 1243 days.

(21) Appl. No.: 13/486,070

(22) Filed: Jun. 1, 2012

(65) Prior Publication Data

US 2012/0309282 A1    Dec. 6, 2012

Related U.S. Application Data

(60) Provisional application No. 61/492,717, filed on Jun. 2, 2011.

(51) Int. Cl.
| | |
|---|---|
| B60H 1/34 | (2006.01) |
| F24F 13/075 | (2006.01) |
| F24F 13/14 | (2006.01) |
| F24F 13/08 | (2006.01) |

(52) U.S. Cl.
CPC ........... *F24F 13/075* (2013.01); *B60H 1/3428* (2013.01); *F24F 13/084* (2013.01); *F24F 13/1413* (2013.01); *Y10T 29/49826* (2015.01)

(58) Field of Classification Search
CPC .............................. F24F 13/075; F24F 13/084
USPC ........................................................ 454/155
See application file for complete search history.

(56) References Cited

U.S. PATENT DOCUMENTS

| | | |
|---|---|---|
| 1,284,267 A | 11/1918 | Eaton |
| 1,866,154 A | 7/1932 | Ell |
| 2,418,012 A | 3/1947 | Chester |
| 2,632,861 A | 3/1953 | Morton et al. |
| 3,143,284 A | 8/1964 | Lindsjo et al. |
| 3,323,763 A | 6/1967 | Butts |
| 3,509,393 A | 4/1970 | Roddy |
| 3,587,442 A | 6/1971 | Jakeway |
| 3,680,470 A | 8/1972 | Neece |

(Continued)

FOREIGN PATENT DOCUMENTS

| | | |
|---|---|---|
| DE | 2519846 | 11/1976 |
| DE | 19621231 | 7/1997 |

(Continued)

OTHER PUBLICATIONS

U.S. Patent and Trademark Office "Communication" for abandoned U.S. Appl. No. 10/783,546, mailed on May 14, 2007, 14 pages.

(Continued)

*Primary Examiner* — Helena Kosanovic
(74) *Attorney, Agent, or Firm* — Meyertons, Hood, Kivlin, Kowert & Goetzel, P.C.; Eric B. Meyertons

(57) ABSTRACT

Systems and methods for a vent are described herein. In some embodiments, a vent may be configured to be positioned in an opening in a surface. The vent may include flexible members configured to inhibit extraction of the vent from the opening once positioned in the opening. The vent may include at least one vane. The vanes may rotate such that, during use, the vanes function to control the direction of fluids conveyed through the vent. In some embodiments, vane(s) may include at least one anti-uncoupling device on a vane to prevent overly exerted forces applied onto the vane by a vent operator from uncoupling the vane from its mating frame axle.

20 Claims, 10 Drawing Sheets

(56) References Cited

U.S. PATENT DOCUMENTS

| | | | |
|---|---|---|---|
| 3,708,243 A | 1/1973 | Wooden | |
| 3,709,633 A | 1/1973 | Wooden | |
| 3,710,094 A | 1/1973 | Monte et al. | |
| 3,735,691 A | 5/1973 | Gofton et al. | |
| 3,744,929 A | 7/1973 | Huntington | |
| 3,952,712 A | 4/1976 | Hermanson | |
| 3,988,973 A | 11/1976 | Honmann | |
| 4,142,227 A | 2/1979 | Aikens | |
| 4,171,190 A | 10/1979 | Hudson | |
| 4,345,510 A | 8/1982 | Sterett | |
| 4,611,531 A | 9/1986 | Kucharczyk | |
| 4,646,625 A | 3/1987 | Schroeder | |
| 4,676,473 A | 6/1987 | Giles | |
| 4,681,221 A | 7/1987 | Chickanosky et al. | |
| 4,750,410 A | 6/1988 | Parker | |
| 4,924,349 A | 5/1990 | Buehler et al. | |
| 4,943,209 A | 7/1990 | Beehler | |
| 5,040,764 A | 8/1991 | Dubois | |
| 5,103,976 A | 4/1992 | Murphy | |
| 5,104,271 A | 4/1992 | Lechler | |
| 5,177,858 A | 1/1993 | Jones | |
| 5,230,612 A | 7/1993 | Murphy | |
| 5,294,655 A | 3/1994 | Lee, Jr. et al. | |
| 5,338,252 A | 8/1994 | Bowler et al. | |
| 5,391,063 A | 2/1995 | Hantle et al. | |
| 5,397,950 A | 3/1995 | Horbury, Jr. et al. | |
| 5,399,119 A | 3/1995 | Birk et al. | |
| 5,403,163 A | 4/1995 | Murphy | |
| 5,418,692 A | 5/1995 | Nemoto | |
| 5,469,658 A | 11/1995 | Digianni et al. | |
| 5,501,634 A | 3/1996 | Wilder | |
| 5,526,241 A | 6/1996 | Ferrell | |
| 5,533,614 A | 7/1996 | Walker | |
| 5,538,470 A | 7/1996 | Norbury, Jr. et al. | |
| 5,547,365 A | 8/1996 | Chuang | |
| 5,558,499 A | 9/1996 | Kobayashi | |
| 5,575,715 A | 11/1996 | Norbury, Jr. et al. | |
| 5,595,438 A | 1/1997 | Burd | |
| 5,722,883 A | 3/1998 | Schwarz | |
| 5,775,500 A | 7/1998 | Williams | |
| 5,826,970 A | 10/1998 | Keller et al. | |
| 5,836,677 A | 11/1998 | Connors et al. | |
| 5,927,947 A | 7/1999 | Botros | |
| 5,964,523 A | 10/1999 | Eversberg | |
| 5,971,156 A | 10/1999 | Slocum et al. | |
| 5,988,979 A | 11/1999 | Wang | |
| 6,082,547 A | 7/2000 | Nentl et al. | |
| 6,158,978 A | 12/2000 | Norbury, Jr. | |
| 6,168,299 B1 | 1/2001 | Yan | |
| 6,290,596 B1 * | 9/2001 | Birdsong | F24F 13/065 454/289 |
| 6,314,680 B1 | 11/2001 | Buckwalter et al. | |
| 6,481,233 B1 | 11/2002 | Calvert | |
| 6,494,780 B1 | 12/2002 | Norbury, Jr. | |
| 6,632,006 B1 | 10/2003 | Rippel et al. | |
| 6,736,442 B2 | 5/2004 | Gebreselassie et al. | |
| 6,779,910 B1 | 8/2004 | Pelton | |
| 7,063,507 B2 | 6/2006 | Hsieh | |
| 7,172,069 B2 | 2/2007 | Coffin et al. | |
| 7,203,416 B2 | 4/2007 | Craw et al. | |
| 7,384,168 B2 | 6/2008 | Whitlow et al. | |
| D586,600 S | 2/2009 | Norbury, Jr. | |
| 7,527,402 B2 | 5/2009 | Scown et al. | |
| 7,681,630 B2 | 3/2010 | Klassen et al. | |
| 7,815,327 B2 | 10/2010 | Shamshoian | |
| 8,056,617 B2 | 11/2011 | Klassen et al. | |
| 2004/0074211 A1 | 4/2004 | Shibata | |
| 2005/0133404 A1 | 6/2005 | White, Jr. | |
| 2005/0225993 A1 | 10/2005 | Yamazaki et al. | |
| 2006/0052046 A1 * | 3/2006 | Krause | B60H 1/3421 454/155 |
| 2009/0298406 A1 | 12/2009 | Norbury, Jr. et al. | |
| 2009/0318073 A1 * | 12/2009 | Rimmer | F24F 13/06 454/289 |

FOREIGN PATENT DOCUMENTS

| | | |
|---|---|---|
| DE | 10007965 | 8/2001 |
| EP | 1136747 | 3/2000 |
| JP | S56-091142 | 7/1981 |
| JP | S59-018011 | 1/1984 |
| JP | S61-079939 | 4/1986 |
| JP | H4-000147 | 1/1992 |
| SE | 220405 | 5/1968 |
| WO | 2007003416 | 1/2007 |

OTHER PUBLICATIONS

U.S. Patent and Trademark Office "Communication" for copending U.S. Appl. No. 12/132,392, mailed Feb. 9, 2012.

* cited by examiner

HEADLINER VENT HOUSING

PRIORITY CLAIM

This Application claims priority to U.S. Provisional Application No. 61/492,717 entitled "HEADLINER VENT HOUSING" to Norbury et al., filed Jun. 2, 2011, which is incorporated herein by reference in its entirety.

BACKGROUND OF THE INVENTION

1. Field of the Invention

The present invention generally relates to vents (a.k.a. louvers or registers) through which fluid (e.g., air) flows through the vent. More particularly, the invention relates to both the mobile and unitary air conditioning and heating industry whereby the fluid may include forced air blowing through openings in either an exterior or interior decorative surfaced mounted vent device.

2. Description of Related Art

Vents may be use to control the flow of fluid. Vents may be either fixed or variable to control the direction of air from a forced air device such as an air conditioning system or heated by a heating system. Vents may be use to direct other fluids from a supplied forced air circulating system into a defined space, containing unit, or an open space. Vents may be used for other situations and with different fluids.

Vents typically include a base and a series of louvered vanes or blades. The number of vanes/blades may vary from one to several. One or more vanes may be fixed or movable to facilitate the direction of fluids passing through the vent as a unit. The vent may be made as one piece unit with at least one or more vanes fixed or the vent may be made in separate component parts. The separate component parts may include one or more vanes used as fixed components or movable components comprising a series of vanes to control the direction of the air flow. The base housing may be stationary or movable. The base housing may be fastened to or attached to a wall, panel, or surface of a structure. The louver/vent component parts and/or the vanes may move (e.g., rotate) relative to the base housing. Adjustment of the louver vanes may control the direction of the fluid flow. In some embodiments the movable vanes may be used to control the amount of flowing fluid or close off the flow of the fluid passing through the vent.

SUMMARY

Embodiments described herein generally relates to systems and methods for providing fluid flow from air circulating systems.

In some embodiments, a vent may include a base housing, at least one vane, and at least two protrusions (e.g., coupled to a wall coupled to the rear surface of the base housing). The vane may be coupled to the base housing. The vane may be configured to influence the direction of fluids conveyed towards the vent. At least two of the protrusions (i.e., protruding from the back plane of the base housing) may be coupled to the base housing. In some embodiments, at least two of the protrusions may be perpendicular to the base housing. At least two of the protrusions may include a flexible member perpendicular to the base housing coupled to the protrusions. The flexible members may include a lower edge facing the base housing at an oblique angle to base housing. The flexible members may be biased away from a central axis perpendicular to the base housing.

In some embodiments, the vent may include a frame coupled to the housing base. The frame may function to rotate relative to the base. At least one vane may be coupled to the frame such that the vane is substantially immovable or in some embodiments, the vane may be coupled such that the at least one vane rotates with the frame. In some embodiments, at least one vane is coupled to the frame using at least two frame axles such that the at least one vane rotates out of the plane of and relative to the frame. At least one of the vanes may rotate relative to the at least two frame axles to inhibit fluid being conveyed through the vent when the at least one vane is in a closed position. The frame may be coupled to the housing base by one or more flexible protrusions to position the frame relative to the housing. In some embodiments, one or more of the flexible protrusions may include an extended end. The extended end may contact the frame to inhibit any repositioning of the frame and at least one vane once set by a user.

In some embodiments, the vent may include at least one "U" shape protrusion coupled to at least one of the vanes such that the "U" shaped protrusion forms a friction fit with the frame axle such that the vane rotates relative to the frame axle during use.

In some embodiments, the vent may include an anti-uncoupling device configured to inhibit at least one vane in an opened position from uncoupling from the frame axle during use.

In some embodiments, the vent may be a portion of an air conditioning or heating system of a unitary unit of a building.

In some embodiments, the vent may be a portion of a ventilation air conditioning system of a vehicle.

In some embodiments, at least a portion of the vent is made of plastic resins, metal, environmentally renewable composite materials and/or a combination thereof.

In some embodiments, the vent may include one or more spring like members configured to bias the flexible members outwards to assist the flexible members to engage a surface once positioned in an opening of the surface.

In some embodiments, the lower oblique edge of the flexible members engage a surface once positioned in an opening of the surface.

In some embodiments, the vent may include a plurality of secondary protrusions coupled to the lower edge of at least one of the flexible members. The secondary protrusions may engage a surface once positioned in an opening of the surface.

In some embodiments, the lower edge of the flexible members may function to engage a surface of a wall comprising a range of thicknesses.

In some embodiments, the vent may include at least one spring-like member coupled to an outer surface of at least one of the protrusions coupled to the base housing. At least one of the spring-like protrusions may be biased away from a central axis perpendicular to the base housing such that the at least one spring-like protrusion is configured to center the vent within an opening.

In some embodiments, at least a portion of the vent is formed from United States Department of Agriculture approved materials.

In some embodiments, a method of installing a vent in an opening may include positioning a vent in an opening in a first surface. The method may include rotating in a first direction, during positioning of the vent, a base housing of the vent such that at least two protrusions coupled to the base housing rotate with the base housing. In some embodiments, it is not necessary to rotate the base housing in order to lock the vent in a panel hole. At least two of the protrusions may be perpendicular to the base housing. At least two of the protrusions may include a flexible member substantially perpendicular to the base housing coupled to the protrusions. The flexible members may include a lower edge facing the base housing at an oblique angle to the base housing such that the flexible member is tapered in a second direction opposite to the first direction. The flexible members may be biased away from a central axis perpendicular to the base housing.

In some embodiments, a method may include rotating in the second direction the base housing after the vent is positioned in the opening such that the lower edge engages second surface, opposite to the first surface, such that the flexible members inhibit removal of the vent from the opening

BRIEF DESCRIPTION OF THE DRAWINGS

Advantages of the present invention may become apparent to those skilled in the art with the benefit of the following detailed description of the preferred embodiments and upon reference to the accompanying drawings.

Figure 1:
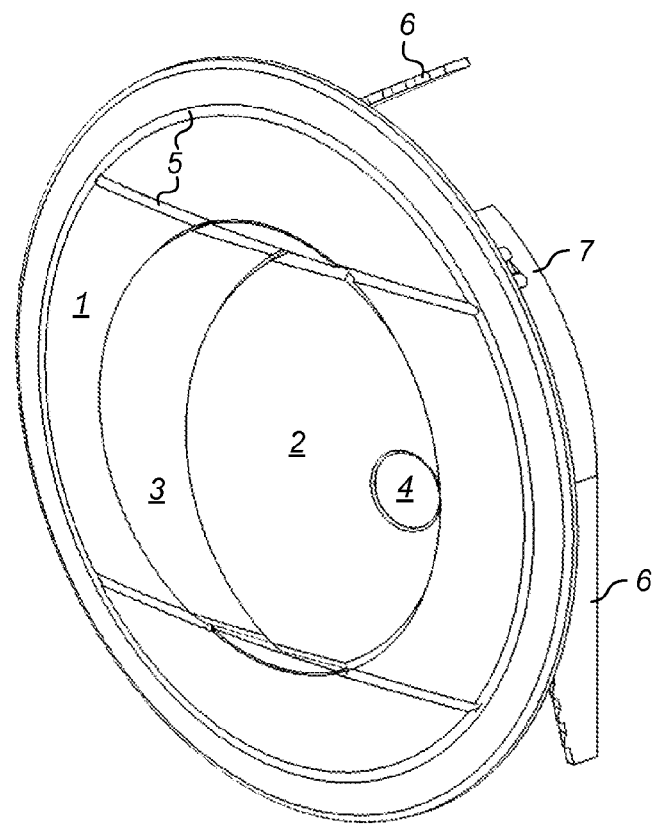
FIG. 1 depicts an embodiment of a front perspective view of a vent with its closed directional fluid control vanes centered in the base housing.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "fluid" as used herein generally refers to a gas, a liquid, an emulsion, a slurry, and/or a stream of liquid or solid particles that have similar characteristics as a liquid flow.

FIG. 1 depicts an embodiment of a front perspective view of a vent with its closed directional fluid control vanes centered in the base housing. FIG. 1 depicts an embodiment of a front perspective view of a round vent (a.k.a. louver or register) assembled. The embodiment depicted in FIG. 1 is that of a round vent, however, this embodiment should not be seen as limiting. A vent may be formed in any shape deemed appropriate for a particular use. A vent may include a base housing 1. A vent may include one or more vanes. In some embodiments, a vent may include two or more vanes. The vent depicted in FIG. 1 includes two vanes 2 and 3 shown in their closed position within base housing 1.

In some embodiments, a vane may include an opening and/or recess. The opening and/or recess may allow an operator to more easily engage the vent. As depicted in FIG. 1 vane 2 may include recess well 4. Recess well 4 may function to indicate to an operator where to apply the initial force by the operator to open the vent to allow fluid (e.g., forced air) to pass through. The operator may apply force by using his finger to engage recess well 4. Fluids (e.g., forced air), in some embodiments, may be supplied by an air circulating system that conveys fluids from a rear of the vent to and through a front of the vent through opened fluid directional vanes during use.

In some embodiments, a vent may include decorative elements. Decorative elements may make a normally utilitarian vent more pleasing to the eye. In some embodiments, decorative elements may include decorative grooves 5. Decorative grooves 5 are only as an example positioned on the showing surfaces of such a designed vent.

In some embodiments, a vent may include a system for coupling the vent to, for example, a wall, a floor, and/or a ceiling. A system may include protrusions 6. Protrusions 6 may include flexible membranes. Flexible membranes may include wing-like members. Protrusions 6 may function to contain a vent within substrate panel/wall 20 (e.g., depicted in FIG. 6 thru 9). A vent may be positioned in opening 21 (e.g., circular) in substrate panel/wall 20. Opening 21 may include openings with any shape appropriate for (e.g., consistent with) the vent being positioned in the opening. The opening may be of other configurations to accommodate other various wing-like protrusions 6 to latch the vent housing within such configured opening in a panel or wall. Protrusions 6 may be coupled to base housing rear support wall 7. Wall 7, in some embodiments, is circular in shape for inserting into opening 21 in an interior fabricated panel 20 (e.g., of a vehicle).

Figure 2:
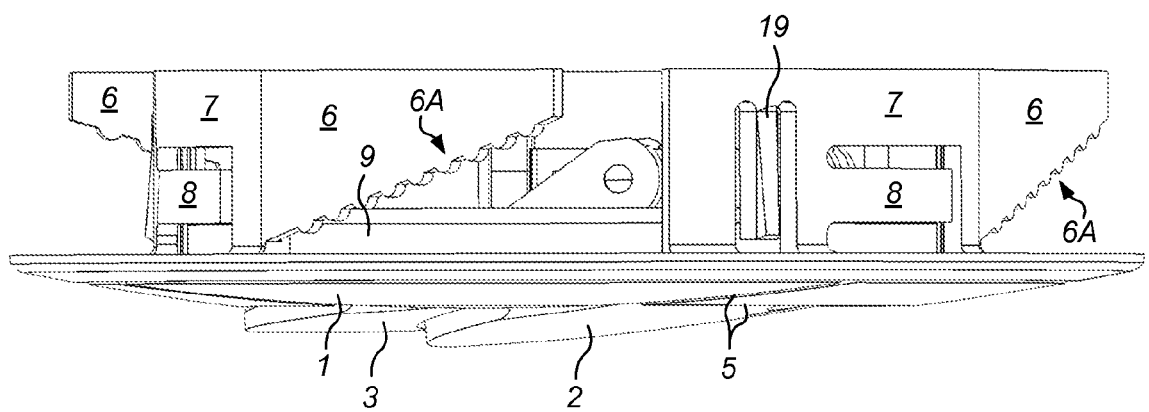
FIG. 2 depicts a top view of the embodiment depicted in FIG. 1.
Figure 5:
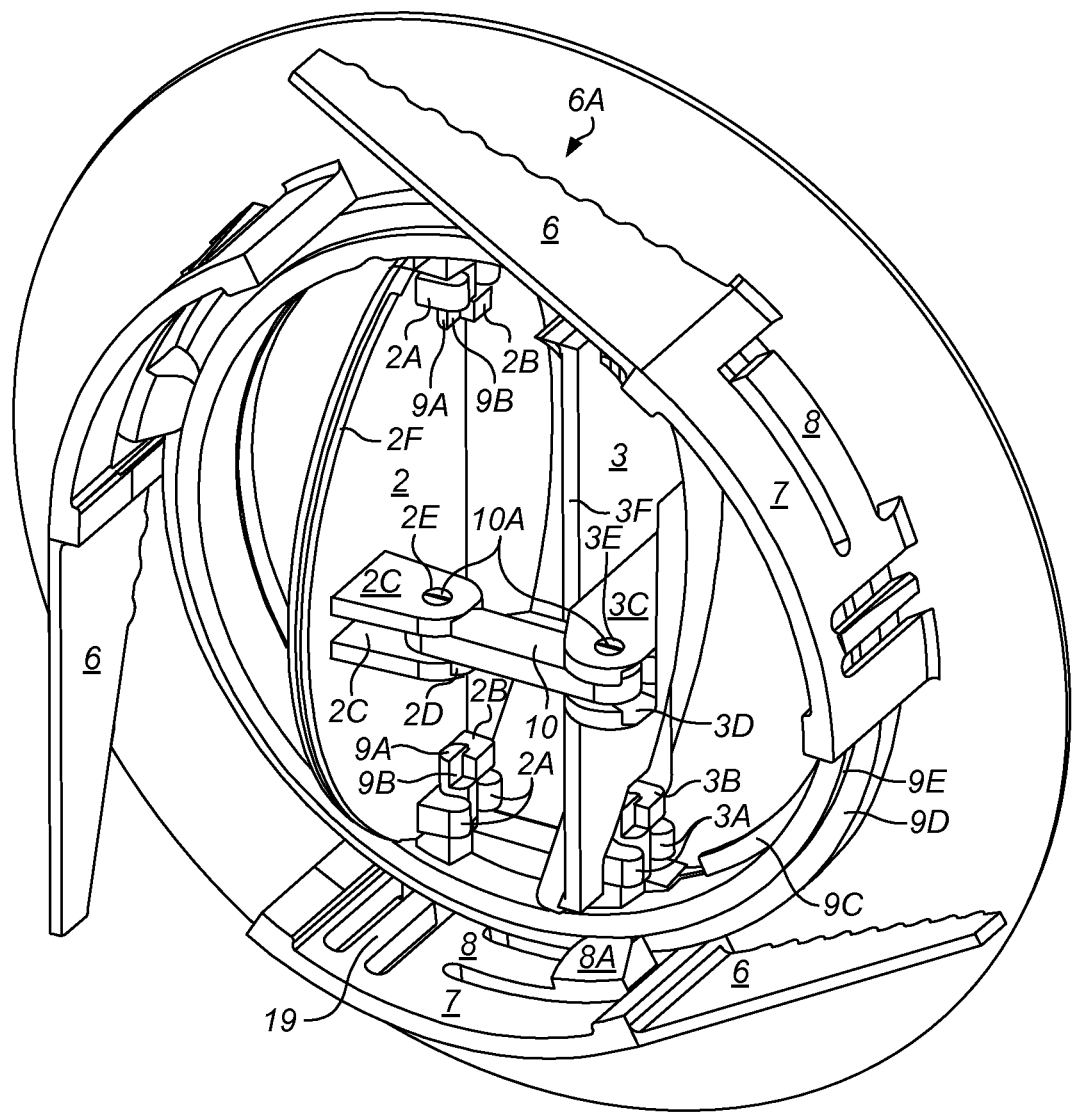
FIG. 5 depicts an embodiment of a rear perspective view of a vent with fluid directing vanes in full open position.

FIG. 2 depicts a top view of the embodiment depicted in FIG. 1. FIG. 2 depicts a detailed profile of protrusion 6 coupled to wall 7. In some embodiments, wall 7 comprises member 8. Member 8 may be spring-like in nature to retract outward from the center of vent 1 to allow for, during assembly, the insertion of frame 9 into the rear of base housing 1 (e.g., the assembled form is depicted in FIG. 5) within the three circular protrusion support walls 7. Protrusion support walls 7 may be of any shape including square or rectangular.

Figure 9:
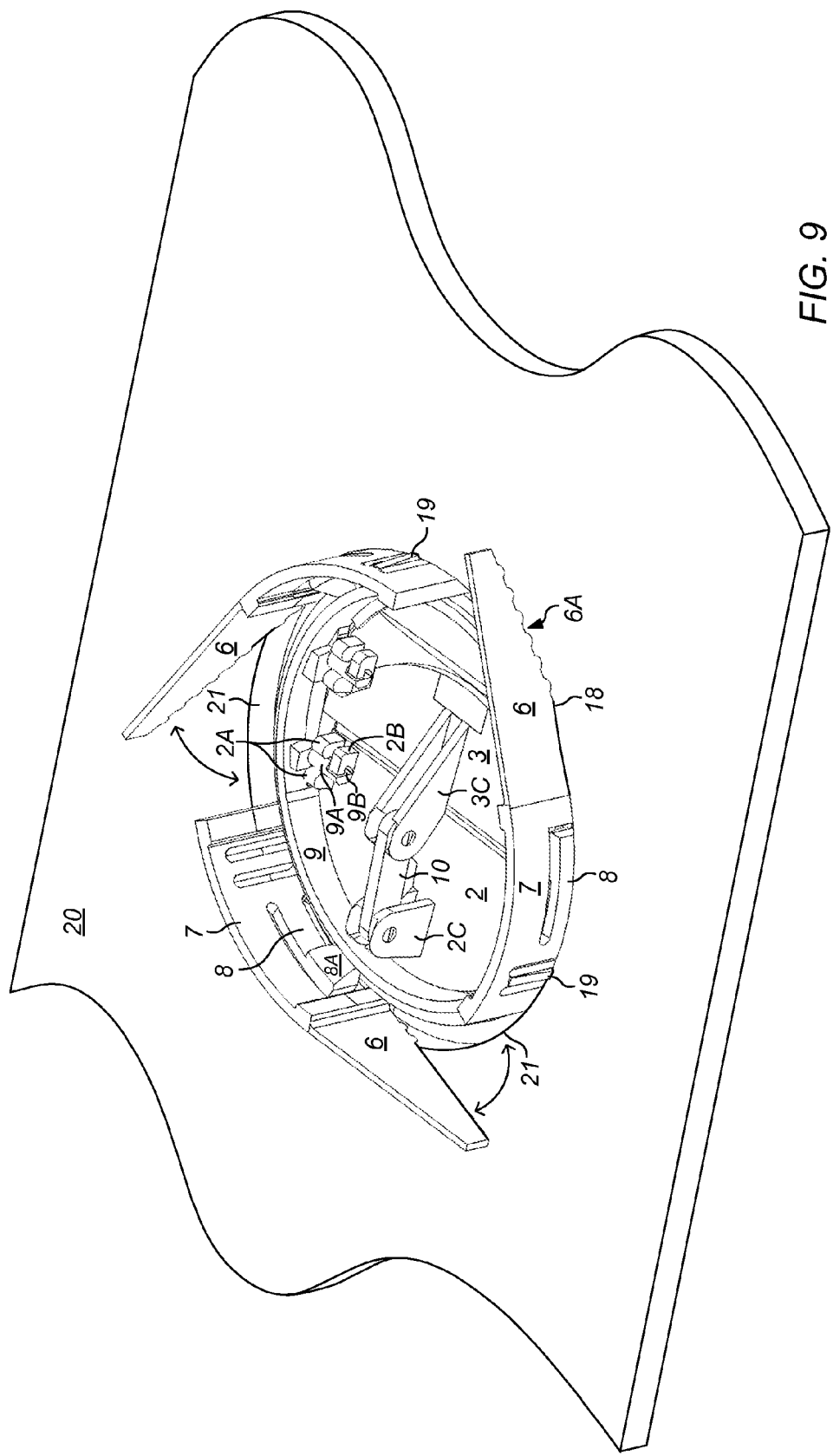
FIG. 9 depicts an embodiment of a rear perspective view of a vent in an illustrative panel section.

In some embodiments, protrusions 6 may include secondary protrusions 6A. Protrusions 6A may be positioned along one or more edges of protrusion 6. Protrusions 6A may function to assist protrusion 6 to engage the back side of panel 20 when a vent is positioned in opening 21 (e.g., as depicted in FIG. 9).

In some embodiments, wall 7 may include member 19. Member 19 may be flexible and generally spring-like in nature. Member 19 may assist and accommodate any differences in opening 21 tolerances. Member 19 may be designed as in this example on a taper. Member 19 may keep base housing 1 and its wall protrusions 7 of a vent centered and firmly held within opening 21.

Figure 3:
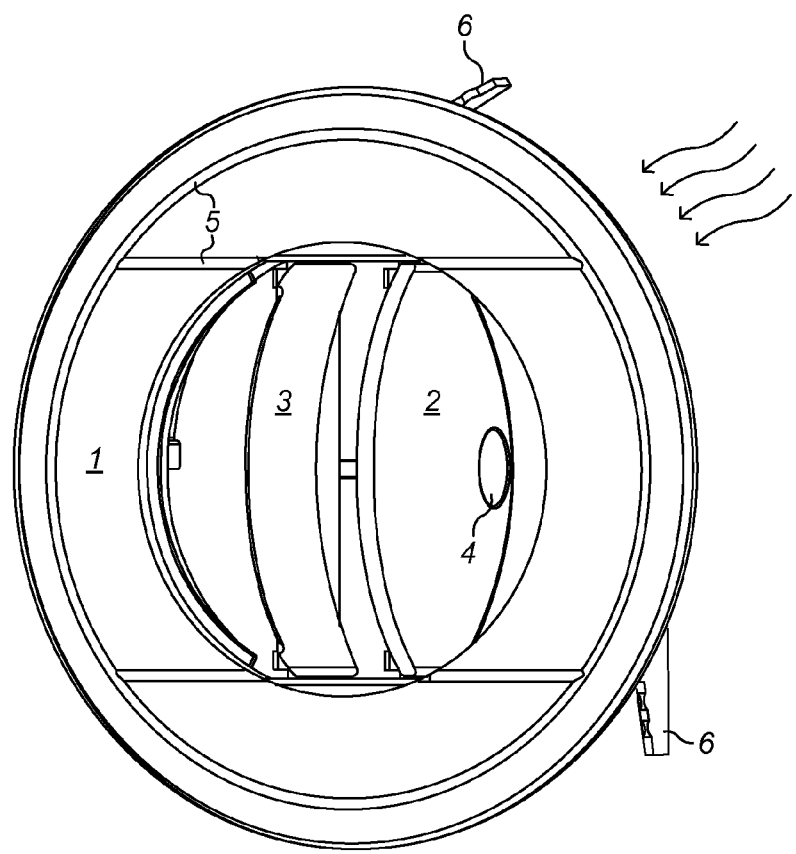
FIG. 3 depicts an embodiment of a front perspective view of a vent with fluid directing vanes in full open position.

FIG. 3 depicts an embodiment of a front perspective view of a vent with fluid directing vanes 2 and 3 in full open position. With vanes 2 and 3 open, a rear supplied forced air may now pass through the openings between vanes 2 and 3 in the center area of a vent.

Figure 4:
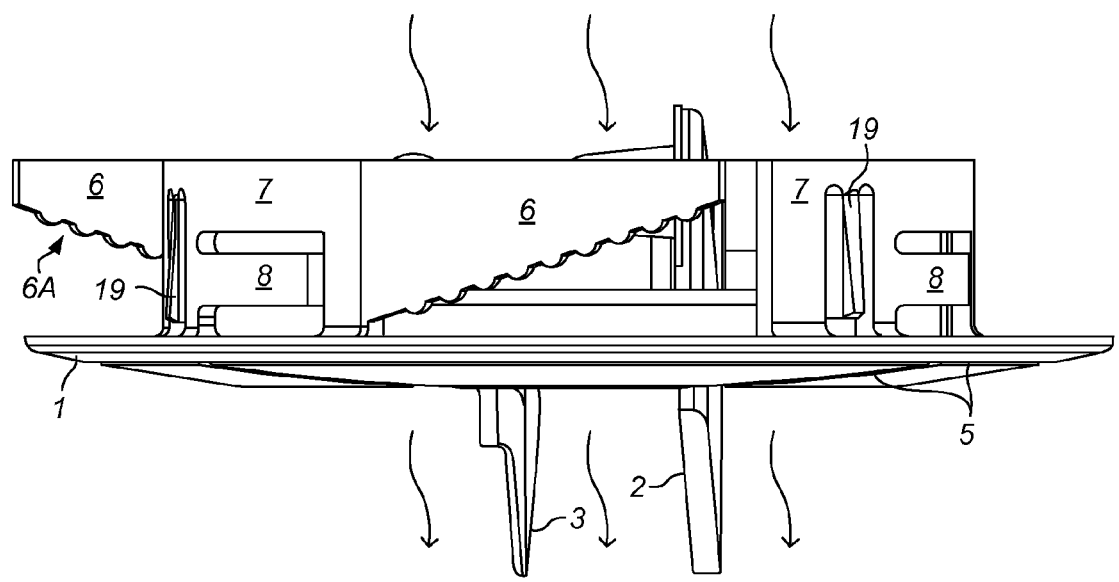
FIG. 4 depicts an embodiment of a top view of a vent with fluid directing vanes in full open position.

FIG. 4 depicts an embodiment of a top view of a vent with fluid directing vanes 2 and 3 in full open position. The rear supplied forced air may pass through the openings between the vanes 2 and 3.

FIG. 5 depicts an embodiment of a rear perspective view of a vent with fluid directing vanes 2 and 3 in full open position. Vanes 2 and 3 may operated together moved to any position from fully closed to fully open position and any where in between by connecting link 10. Connecting link 10 may include protruding axles 10A. Protruding axles 10A may be designed for coupling vanes 2 and 3 at a desired distance while the vanes rotates. In some embodiments, connecting axles 10A may be inserted into protrusions 2C and 3C. Protrusions 2C and 3C may be flexible and generally spring-like in nature. Protrusions 2C and 3C may be attached on the rear side of vanes 2 and 3 respectively. In some embodiments, as connecting link axles 10A are pushed between protrusions 2C and 3C and down the protrusions declining ramp 2D and 3D in which the connecting link axles 10A may snap into protrusions 2C and 3C openings 2E and 3E. In some embodiments, one may find assembling link 10 while vanes 2 and 3 are in a closed position (e.g., depicted in FIG. 8) easier than if the vanes were in an open position. This completes the assembly of the connecting link to each vane.

Figure 11A:
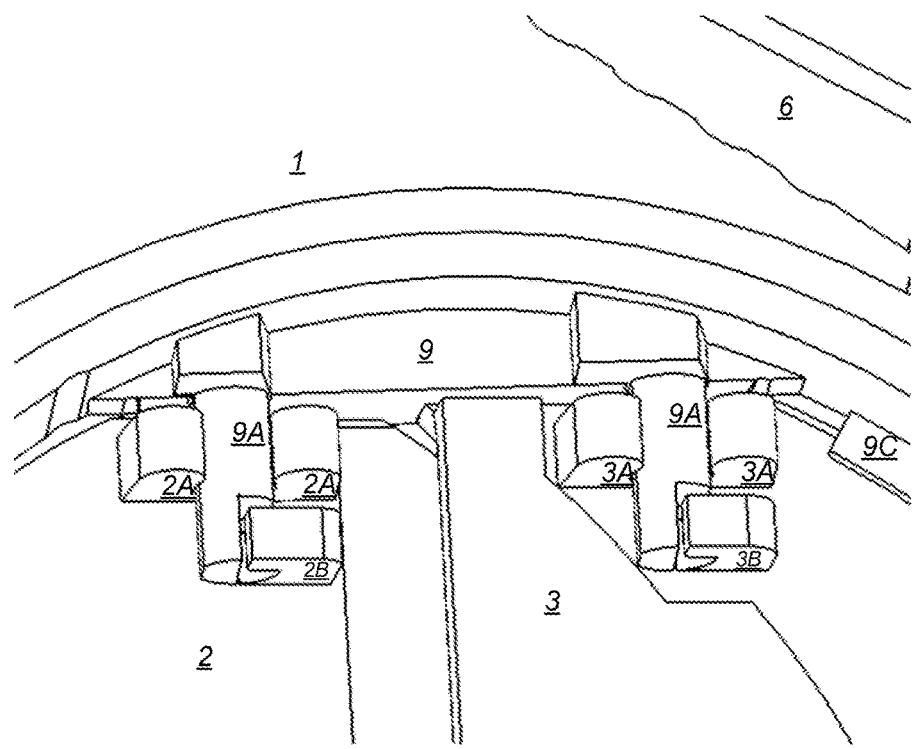
FIGS. 11A-B depict embodiments of a portion of the closed vanes coupled to the vane circular frame axles and each vane's anti-uncoupling device in an initial position.
Figure 11B:
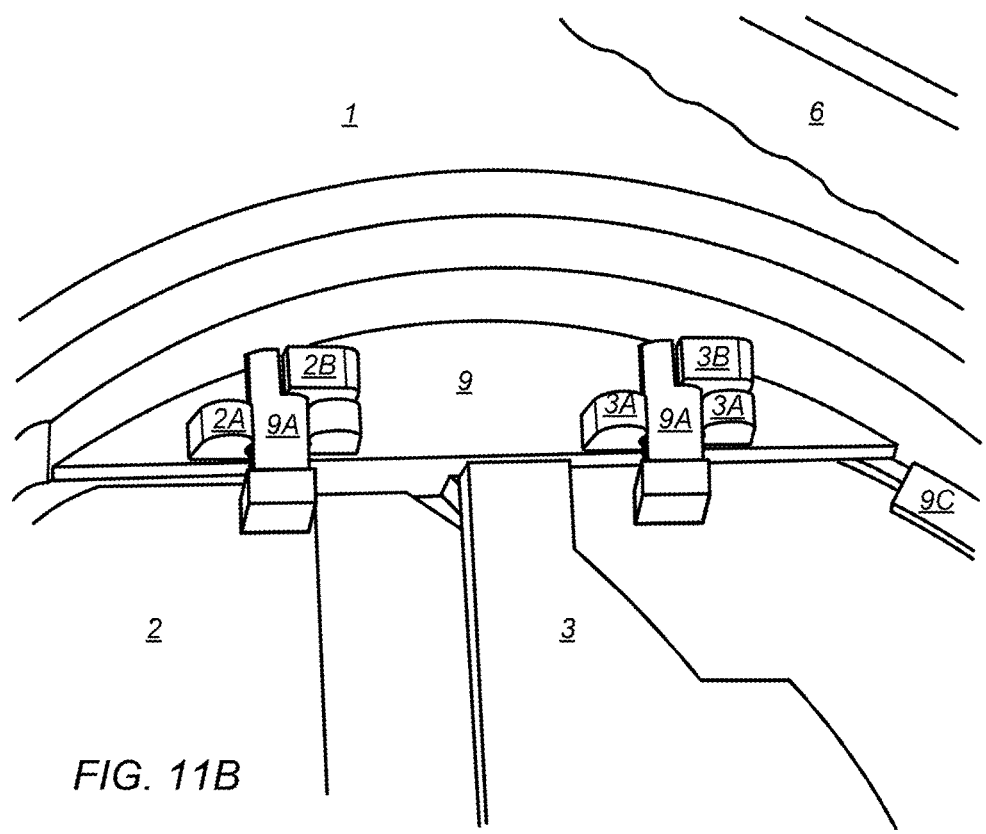
Figure 12:
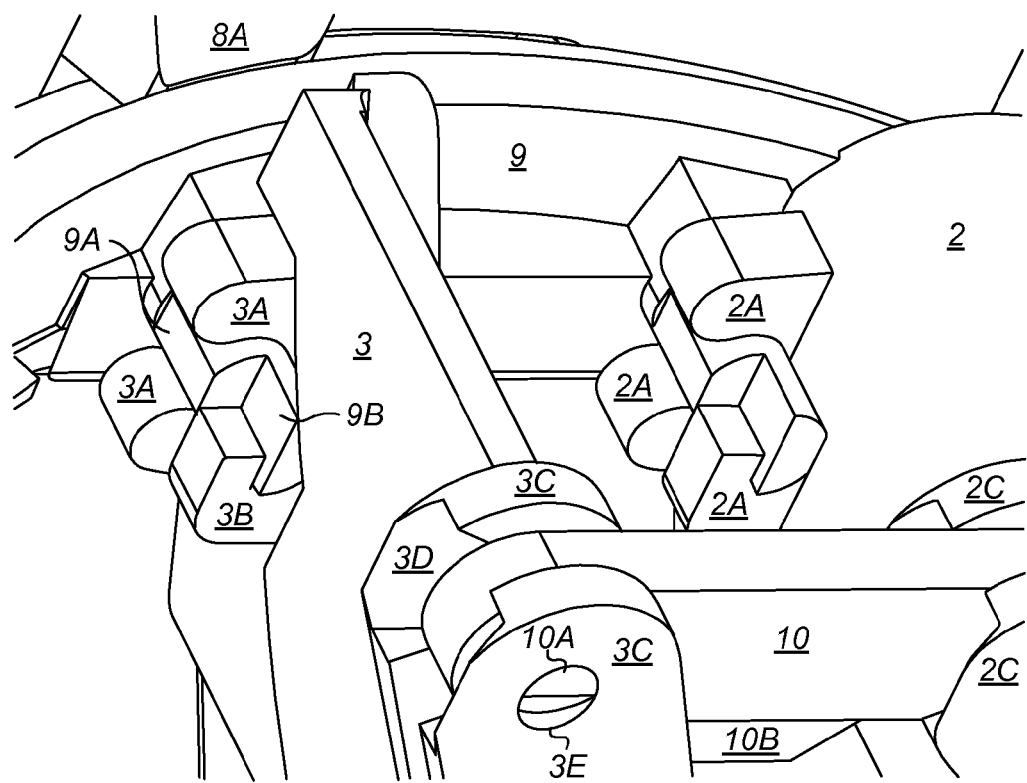
FIG. 12 depicts an embodiment of a portion of fully open vane position with respect to the vane circular frame axles and each vane's anti-uncoupling device in an engaged position.

Vanes 2 and 3 (e.g., as depicted in FIG. 5) may be assembled onto a circular frame 9 that comprises a set of axles 9A. Each vane 2 and 3 may include one or more protrusions. The vanes protrusions may include a spring-like "U" shape. Protrusions 2A and 3A may be positioned at each rotation point. Protrusions 2A and 3A may be in alignment to each other to receive the insertion of circular frame axles 9A during assembly. Axles 9A may be inserted between "U" shape protrusions 2A and 3A until the ends of the "U" shape features snaps back around each axle 9A. These "U" shape features 2A and 3A may have some degree of friction between the "U" surface and the perimeter surfaces of axles 9A that holds the vanes in a desired opened position and allows the vanes to rotate on axles 9A (e.g., as depicted in FIGS. 11A-B and FIG. 12).

In some embodiments, located at the end of each axle 9A may be protrusion 9B. Protrusion 9B may include an extended semi-circle. Protrusion 9B may be designed to mate with and lock under each vane protrusion 2B and 3B. Protrusion 2B and 3B may be "L" shaped. Protrusion 9B may be designed to mate with and lock under each vane protrusion 2B and 3B when the vanes are in an open position (e.g., as depicted in FIGS. 11A-B close-up view with vanes in closed position and FIG. 12 with vanes in fully opened position).

In some embodiments, at least one of the vanes may include ridge 2F. Ridge 2F may include a circular raised ridge. Ridge 2F may be positioned on the circular perimeter of vane 2 (e.g., as depicted in FIG. 5). This circular protrusion may be used for the purpose of reducing any forced air leakage between vane 2 perimeter and the inside surface of the circular frame 9 when the vane is in fully closed position (e.g., as depicted in FIG. 1).

Figure 6:
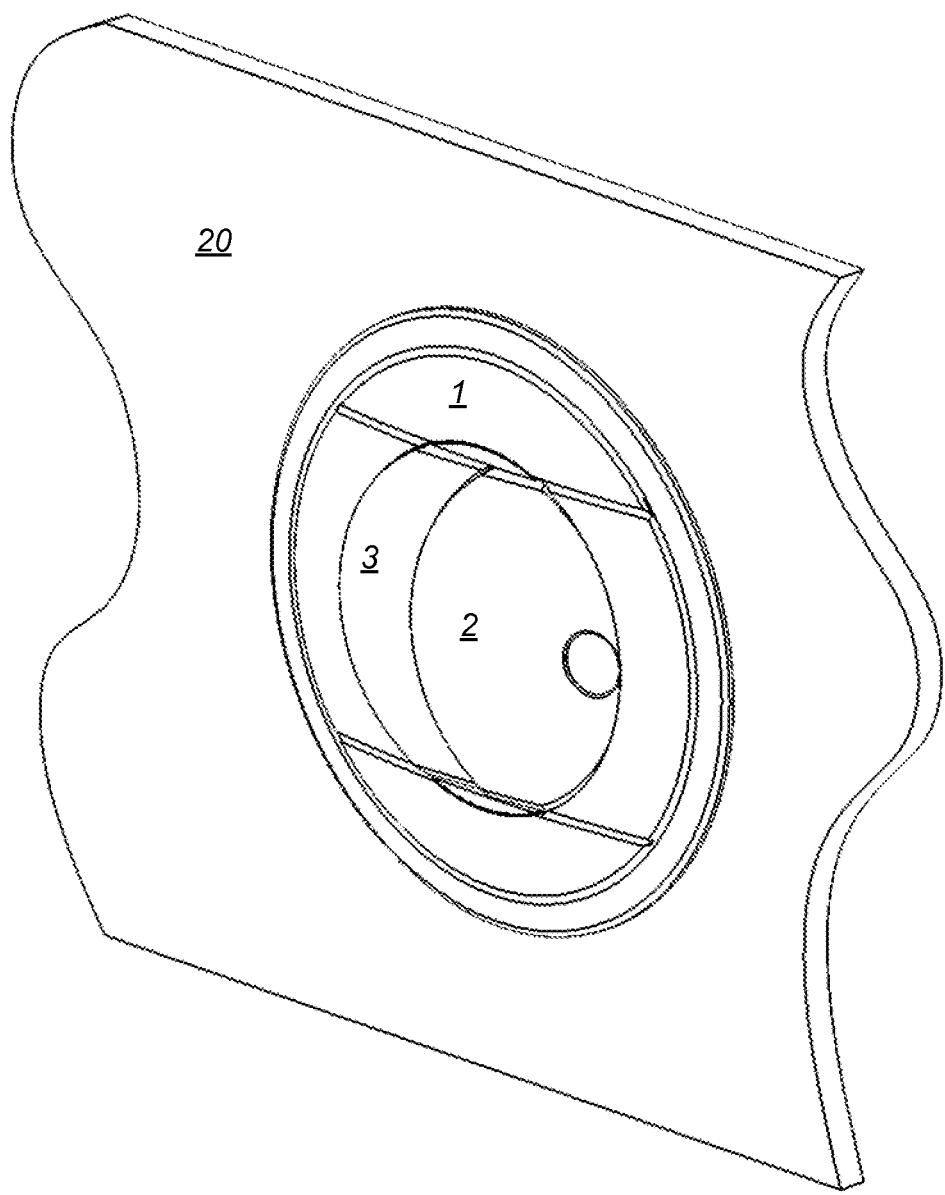
FIG. 6 depicts an embodiment of a front perspective view of a vent with vent in an illustrative panel section.

FIG. 6 depicts an embodiment of a front perspective view of a vent with the vent positioned in an illustrative panel section. In FIG. 6 a vent assembly housing 1 is depicted in a sectional partition or fabricated panel 20 with housing 1's vanes 2 and 3 in full closed position. Panel 20 has a circular opening 21 (e.g., as depicted in FIG. 8) in which the vent assembly housing 1 is inserted and held into the panel.

Figure 7:
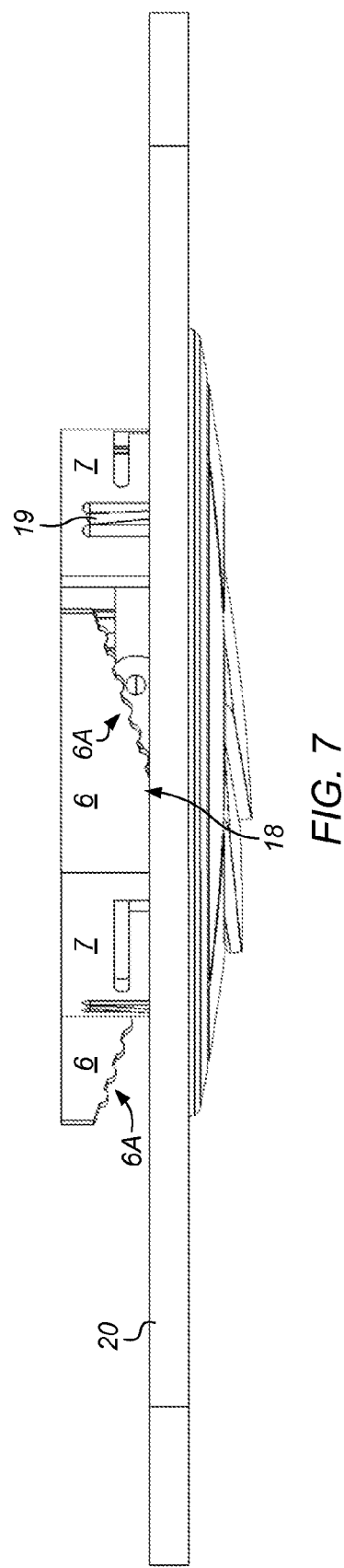
FIG. 7 depicts an embodiment of a top view of a vent in an illustrative panel section.

FIG. 7 depicts an embodiment of a top view of a vent in a panel section. FIG. 7 is a top view of the embodiment depicted in FIG. 6 showing member 6 has repositioned back outward toward its original position after the members 6 have passed through the panel opening 21 (e.g., as depicted in FIG. 9). This view also depicts an illustration of an embodiment including protrusions 6A along the bottom edge of member 6 to assist in grasping onto the rear surface of panel 20. Different protrusion configurations may be designed to better serve this purpose (e.g., depending on the surface to which the protrusions are configured to engage). Furthermore, this view depicts an embodiment including spring-like member 19. Member 19 may be used to assist in centering and holding the vent housing 1 within a panel opening 21 especially useful if the opening is cut out slightly larger to an upper acceptable tolerance size. The spring-like member may be designed with a taper with an inclined surface. There may be one spring-like tapered member 19 on each of the three support circular wall protrusions 7. One may see as the circular upright support wall or protrusions 7 pass into panel opening 21, spring-like member 19 may adjust/bend outward or inward to accommodate the tolerances of the hole for better secured fitness of the housing within opening 21.

Figure 8:
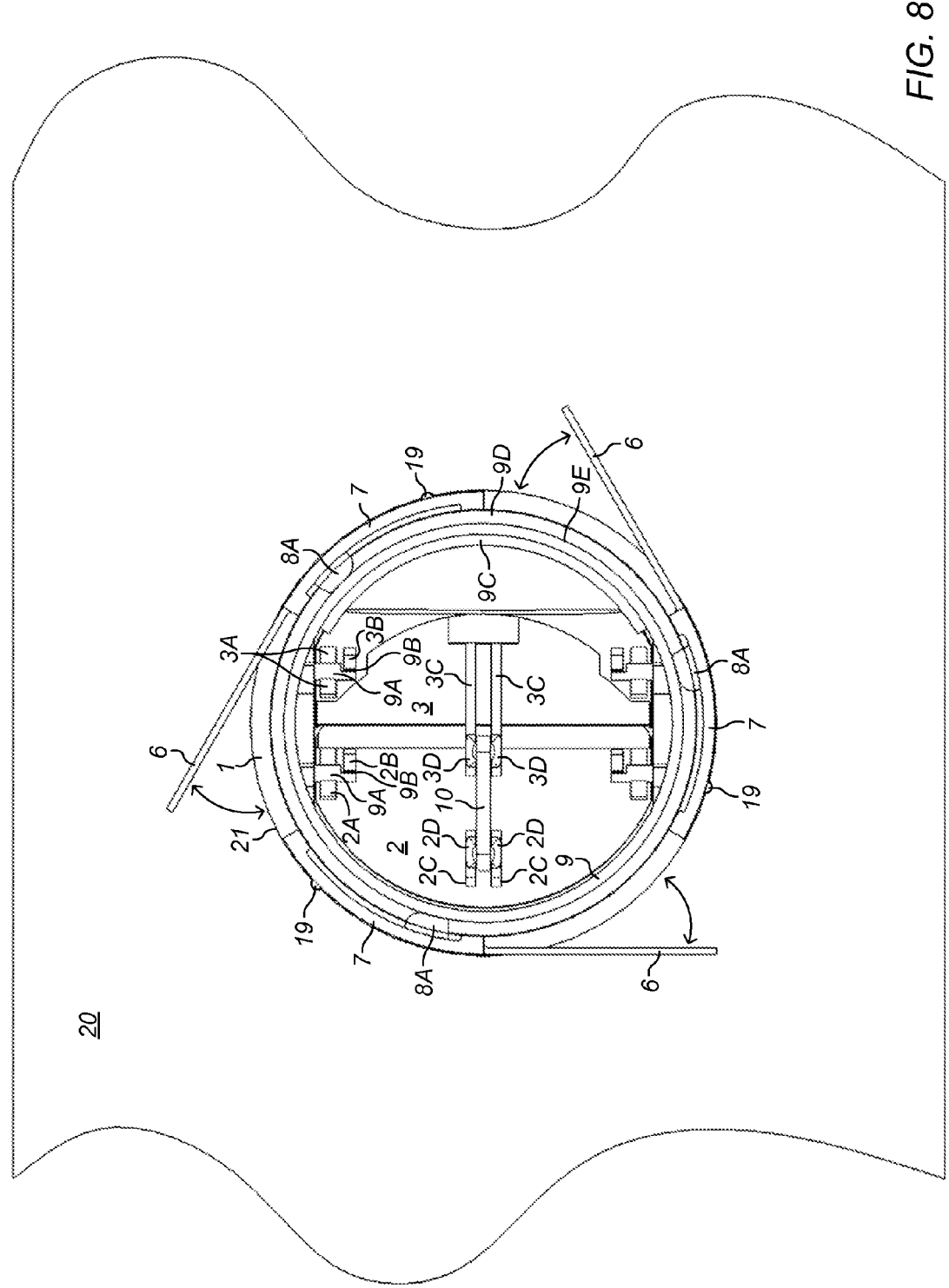
FIG. 8 depicts an embodiment of a rear view of a vent in an illustrative panel section.

FIG. 8 depicts an embodiment of a rear view of a vent in panel section 20. FIG. 8 shows the rear view with the vent vanes 2 and 3 in fully closed position in a panel section. The embodiment depicted in FIG. 8 depicts circular frame 9 positioned within three circular support walls/protrusions 7. Circular frame 9 may be held in this position on the back side of the vent housing 1 by a serration of snap lugs 8A (e.g., three lugs are depicted in the embodiment in FIG. 8). In some embodiments, when frame 9 is pushed down and into the back side of vent housing 1, the sloped surfaces on snap lugs 8A may allow members 8 (e.g., as depicted in FIG.

5) on protrusions 7 to bend or retract outward to allow the ends of the snap lugs 8A to pass by the circular perimeter edge of frame 9. Upon the perimeter edge and perimeter surface passing by the ends of snap lugs 8A, the snap lugs may spring back by members 8 and pass over frame ledge 9D (e.g., as depicted in FIG. 5). The return of the snap lugs over frame ledge 9D may secure and hold frame 9 in its position in the rear of vent housing 1.

In some embodiments, one may desire by design to have the ends of snap lugs 8A to come in contact or touch frame surface 9E to add some degree of friction between the ends of snap lugs 8A in contact with frame surface 9E. The purpose of this is to help hold the desired position of opened vanes 2 and 3 in a desired position in relation to vent housing 1 positioned in panel 20. Often times a vent assembly may experience vibrations (e.g., due to a panel installed in a vehicle). One may change the opened vanes 2 and 3 to another desired position to allow the forced air direction flow in another direction. This direction of forced air can be made during the rotation of the circular frame 9 with vanes 2 and 3 within the vent housing in either direction. The operator of the vent assembly may change the air flow direction by grasping opened vanes 2 and 3 and twist/rotate the sub assembly of vanes on frame 9 in vent housing 1. The final position set by the operator may be held by snap lugs 8A in contact with frame ledge 9D and surface 9E. Vanes 2 and 3 may also be set at a desired position between a fully open and a fully closed position (e.g., see FIG. 3 and FIG. 4).

FIG. 9 depicts an embodiment of a rear perspective view of a vent in panel section 20. The embodiment depicted in FIG. 9 illustrates wing-like members 6 securing the vent housing 1 within the panel opening 21 by expanding outward until the wing-like members come in contact with the opening's edge 18. Member nubs 6A may function to assist in further engaging the rear surface of opening 21.

Figure 10:
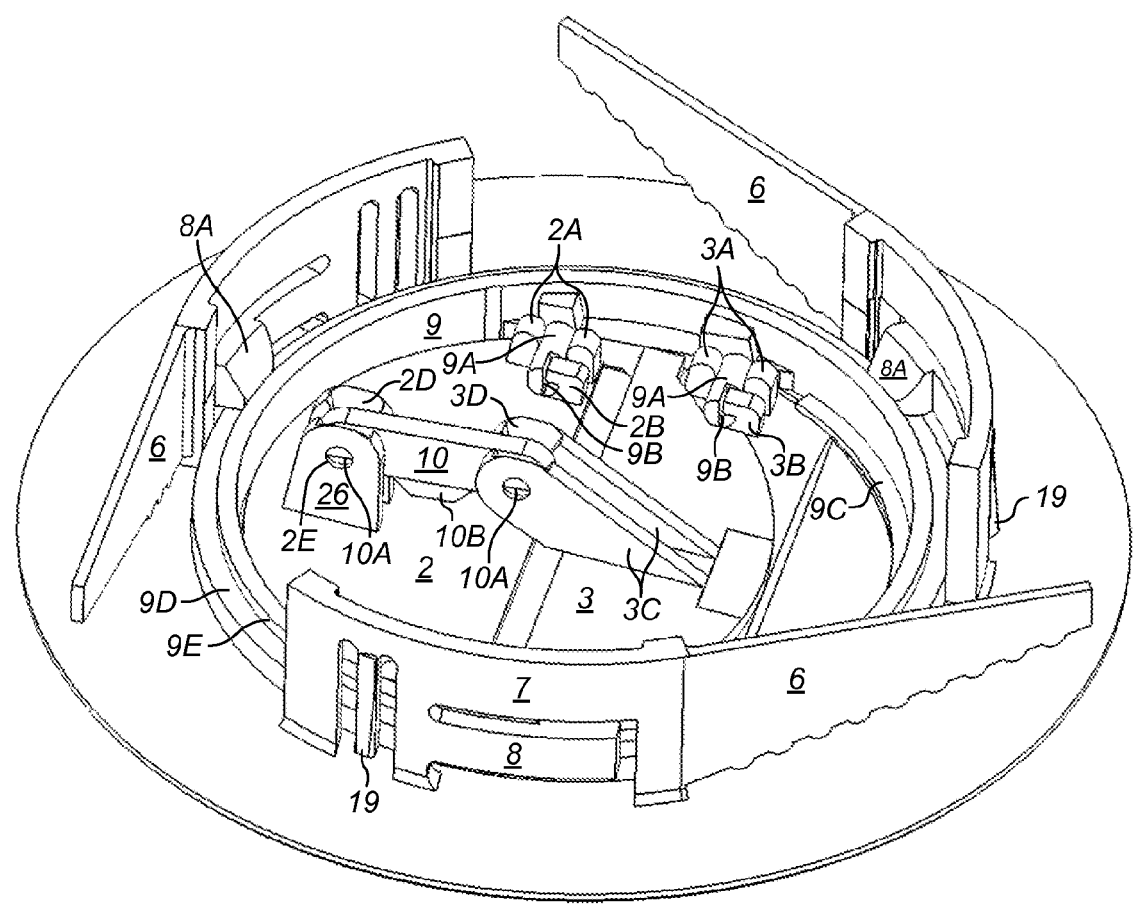
FIG. 10 depicts an embodiment of a rear perspective view of a vent.

FIG. 10 depicts an embodiment of a rear perspective view of a vent. Connecting link 10 may include side stop protrusion 10B. Protrusion 10B may function to help stop or limit the opening of the vanes. Protrusion 10B may be designed with a different height to stop by interference connecting link 10 coming into contact with back edge 3F of vane 3 (e.g., depicted in FIG. 5). The height of the stop protrusion may determine where vanes 2 and 3 will stop opening during its rotation on frame axles 9A.

FIG. 11A depicts an embodiment of a portion of the closed vanes coupled to the vane circular frame axles and each vane's anti-uncoupling device in an initial position. FIG. 11A is a perspective view of a vanes snap-in "U" shaped 2A and 3A protrusions and circular frame axles 9A coupled within. FIG. 11A depicts the vanes fully closed. When axles 9A are forced into "U" shaped vanes protrusions 2A and 3A semi-circular axle end protrusions 9B may be allowed to pass by the ends of each vane anti-uncoupling inverted "L" shape cantle lever protrusion 2B and 3B while the vanes are assembled onto circular frame 9 in a closed position arrangement.

FIG. 12 depicts an embodiment of a portion of fully open vane position with respect to the vane circular frame axles and each vane's anti-uncoupling device in an engaged position. FIG. 12 is another still closer perspective view of the vanes snap-in "U" shape protrusions and the circular frame and its axles coupled together with the vanes in fully opened position. In this view with vanes 2 and 3 fully opened the anti-uncoupling cantle lever protrusions 2B and 3B are engaged with circular frame axle's semi-circle ends 9B. In some embodiments, the purpose of the anti- uncoupling feature is to prevent a possibility of the vanes from uncoupling from the frame axles 9A should there be excessive force applied while the vent operator grasps both opened vanes at the same time (e.g., squeezing an opposingly applied forces in the direction toward each vane) and while rotating together vanes 2 and 3 and it's circular frame 9 within vent housing 1 to another desired air flow position.

Whereas described above as spring like members such as the wing-like members 6, the side spring-like snap lugs 8 and 8A device, and the hole tolerance spring-like tapered member 19 may be formed using materials such as plastic molded resins, glass filled plastic resins, metal, or using acceptable environmental renewable materials in a plastic resin suitable for its applications. Other portions of a vent may be formed from less flexible materials known to one skilled in the art, although of course flexible materials may be used as well. Materials may be chosen not only for their innate construction properties but their cost effectiveness as well.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A vent, comprising:
   a base housing;
   a frame coupled to the base housing, wherein the frame is configured to rotate relative to the base;
   at least one vane coupled to the frame such that the at least one vane rotates with the frame, wherein the at least one vane is coupled to the frame using at least two axles such that the at least one vane rotates out of a plane of and relative to the frame, wherein the at least one vane is configured to influence the direction of fluids conveyed towards the vent;
   at least one substantially "U" shaped protrusion coupled to one of the vane or the frame such that the substantially "U" shaped protrusions forms a friction fit with the one of the at least two axels coupled to the at least one of the vane or the frame, such that the vane rotates relative to the frame during use; and
   at least two protrusions coupled to the base housing, wherein the at least two protrusions are substantially perpendicular to the base housing, wherein the at least two protrusions comprise a flexible member perpendicular to the base housing coupled to the protrusions, wherein the flexible member comprises a lower edge facing the base housing at an oblique angle to base housing, wherein the flexible member is biased away from a central axis perpendicular to the base housing, and wherein the flexible member is tapered in a direction extending away from the central axis.

2. The vent in claim 1, wherein the frame is coupled to the base housing by one or more flexible protrusions to position the frame relative to the housing.

3. The vent of claim 2, wherein the one or more flexible protrusions comprise an extended end, wherein the extended end contacts the frame to inhibit any repositioning of the frame and at least one vane once set by a user.

4. The vent of claim 1, wherein at least one of the vanes rotates relative to the frame to inhibit fluid being conveyed through the vent when the at least one vane is in a closed position.

5. The vent of claim 1, wherein the vent is a portion of an air conditioning or heating system of a unitary unit of a building.

6. The vent of claim 1, wherein the vent is a portion of a ventilation air conditioning system of a vehicle.

7. The vent of claim 1, wherein at least a portion of the vent is made of plastic resins, metal, environmentally renewable composite materials and/or a combination there of.

8. The vent of claim 1, further comprising one or more spring like members configured to bias the flexible member outwards to assist the flexible member to engage a surface once positioned in an opening of the surface.

9. The vent of claim 1, wherein the lower edge of the flexible member engages a surface once positioned in an opening of the surface.

10. The vent of claim 1, further comprising a plurality of secondary protrusions coupled to the lower edge of at least one of the flexible members, wherein the secondary protrusions engage a surface once positioned in an opening of the surface.

11. The vent of claim 1, wherein the lower edge of the flexible member is configured to engage a surface of a wall comprising a range of thicknesses.

12. The vent of claim 1, further comprising at least one spring-like member coupled to an outer surface of at least one of the protrusions coupled to the base housing, wherein at least one of the spring-like protrusions is biased away from a central axis perpendicular to the base housing such that the at least one spring-like protrusion is configured to center the vent within an opening.

13. The vent of claim 1, wherein at least a portion of the vent is formed from United States Department of Agriculture approved materials.

14. A method of installing a vent in an opening, comprising:
positioning a vent in an opening in a first surface;
rotating in a first direction, during positioning of the vent, a base housing of the vent such that at least two protrusions coupled to the base housing rotate with the base housing, wherein the at least two protrusions are substantially perpendicular to the base housing, wherein the at least two protrusions comprise a flexible member perpendicular to the base housing coupled to the at least two protrusions, wherein the flexible member comprise a lower edge facing the base housing at an oblique angle to the base housing such that the flexible member is tapered in a second direction opposite to the first direction, and wherein the flexible member is biased away from a central axis perpendicular to the base housing; and
rotating in the second direction the base housing after the vent is positioned in the opening such that the lower edge engages a second surface, opposite to the first surface, such that the flexible member inhibits removal of the vent from the opening.

15. A vent, comprising:
a base housing;
at least one vane coupled to the base housing, wherein the at least one vane is configured to influence the direction of fluids conveyed towards the vent;
at least two protrusions coupled to the base housing, wherein the at least two protrusions are substantially perpendicular to the base housing, wherein the at least two protrusions comprise a flexible member perpendicular to the base housing coupled to the protrusions, wherein the flexible member comprise a lower edge facing the base housing at an oblique angle to base housing, and wherein the flexible member are biased away from a central axis perpendicular to the base housing
a frame coupled to the base housing, wherein the frame is configured to rotate relative to the base, wherein at least one vane is coupled to the frame such that the at least one vane rotates with the frame, wherein the at least one vane is coupled to the frame using at least two axles such that the at least one vane rotates out of a plane of and relative to the frame;
at least one substantially "U" shaped protrusion coupled to the at least one vane or the frame such that the substantially "U" shaped protrusion forms a friction fit with at least one of the at least two axles, such that the vane rotates relative to the at least one of the at least two axles during use; and
an anti-uncoupling device configured to inhibit at least one vane in an opened position from uncoupling from the at least two axles coupled to the frame during use.

16. The method of claim 14, further comprising:
rotating a frame, coupled to the base housing, relative to the base housing;
rotating at least one vane, coupled to the frame, with the frame; and
rotating the at least one vane, coupled to the frame using at least two axles, out of a plane of and relative to the frame.

17. The method of claim 16, further comprising inhibiting fluid being conveyed through the vent when the at least one vane is in a closed position.

18. The method of claim 14, further comprising engaging a surface of a wall using the lower edge of the flexible member, wherein the surface of the wall comprises a range of thicknesses.

19. The method of claim 14, further comprising engaging the second surface using a plurality of secondary protrusions coupled to the lower edge of at least one of the flexible members.

20. The method of claim 14, further comprising biasing the flexible member outwards using one or more spring like members to assist the flexible member to engage the second surface.

* * * * *